(12) United States Patent　　(10) Patent No.: US 8,779,684 B2
Chang　　(45) Date of Patent: Jul. 15, 2014

(54) HIGH GATE VOLTAGE GENERATOR AND DISPLAY MODULE INCLUDING THE SAME

(71) Applicant: Au Optronics Corporation, Hsinchu (TW)

(72) Inventor: Meng-Sheng Chang, Chiayi (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/706,365

(22) Filed: Dec. 6, 2012

(65) Prior Publication Data

US 2013/0169181 A1　　Jul. 4, 2013

(30) Foreign Application Priority Data

Dec. 30, 2011　(TW) .............................. 100149872 A

(51) Int. Cl.
　*H05B 37/02*　　(2006.01)
(52) U.S. Cl.
　USPC ............. 315/291; 315/294; 315/297; 345/80; 345/94; 345/98; 345/102
(58) Field of Classification Search
　CPC ............... H05B 37/02; H05B 41/3927; H05B 33/0815; G09G 2320/029; G09G 3/3233; G09G 3/3696; G09G 3/3406; G09G 3/00
　USPC ......... 315/291, 247, 307, 169.3, 294; 345/80, 345/87, 55, 94, 98, 102, 211; 323/234, 282
　See application file for complete search history.

(56) References Cited

U.S. PATENT DOCUMENTS

| 7,417,616 B2 * | 8/2008 | Min et al. ...................... 345/102 |
| 7,573,211 B2 | 8/2009 | Liu |
| 8,035,364 B2 * | 10/2011 | Williams ....................... 323/282 |
| 8,174,470 B2 * | 5/2012 | Ahn et al. ......................... 345/87 |
| 8,194,063 B2 * | 6/2012 | Levey et al. .................... 345/211 |
| 8,248,341 B2 * | 8/2012 | Neugebauer .................... 345/87 |
| 2008/0111504 A1 | 5/2008 | Liu |
| 2011/0304311 A1 * | 12/2011 | Takahashi et al. ............. 323/311 |

FOREIGN PATENT DOCUMENTS

| TW | 200822027 | 5/2008 |
| TW | 201005350 | 2/2010 |
| TW | M391248 | 10/2010 |
| TW | I335709 | 1/2011 |
| TW | 201126498 | 8/2011 |

OTHER PUBLICATIONS

"Office Action of Taiwan Counterpart Application", issued on Jan. 14, 2014, p. 1-p. 5.

* cited by examiner

*Primary Examiner* — Haiss Philogene
(74) *Attorney, Agent, or Firm* — Jianq Chyun IP Office

(57) ABSTRACT

A high gate voltage generator and a display module are provided. The high gate voltage generator includes a pulse width modulation (PWM) signal generating circuit, a boost circuit, and an amplifier circuit. The PWM signal generating circuit is used for outputting a PWM signal. The boost circuit is electrically connected to the PWM signal generating circuit and used for receiving an input voltage to boost the input voltage according to the PWM signal and then outputting a power voltage. The amplifier circuit is electrically connected to the boost circuit and used for receiving a reference voltage to amplify the power voltage and then outputting a high gate voltage. The reference voltage is greater than the high gate voltage and is provided by a backlight module electrically connected to the amplifier circuit.

15 Claims, 3 Drawing Sheets

HIGH GATE VOLTAGE GENERATOR AND DISPLAY MODULE INCLUDING THE SAME

CROSS-REFERENCE TO RELATED APPLICATION

This application claims the priority benefit of Taiwan application serial no. 100149872, filed on Dec. 30, 2011. The entirety of the above-mentioned patent application is hereby incorporated by reference herein and made a part of this specification.

BACKGROUND

1. Technical Field

The disclosure relates to a high gate voltage generator and a display module. More particularly, the disclosure relates to a gate voltage generator using an amplifier circuit to adjust a gate voltage and a display module.

2. Description of Related Art

In recent years, with great advance in the semiconductor technique, portable electronic devices and flat panel display apparatuses have been rapidly developed.

In general, a plurality of pixels are disposed on a display panel, and the pixels are switched on after receiving a high gate voltage output from a gate driver. Here, the conventional high gate voltage is generated by a charge pump integrally amplifies a power voltage, and the power voltage is generated by a power chip. The integral amplification of the charge pump restricts the applicable voltage level of the high gate voltage. In order for the high gate voltage to comply with the electrical properties of pixels, a voltage-limiting device (e.g., Zener diode) may be applied to adjust the voltage level of the high gate voltage. Nevertheless, adjustment of the voltage level of the high gate voltage by applying the voltage-limiting device leads to additional power consumption.

SUMMARY OF THE DISCLOSURE

The disclosure is directed to a high gate voltage generator that includes a pulse width modulation (PWM) signal generating circuit, a boost circuit, and an amplifier circuit. The PWM signal generating circuit is used for outputting a PWM signal. The boost circuit is electrically connected to the PWM signal generating circuit and for receiving an input voltage to boost the input voltage and then outputting a power voltage according to the PWM signal. The amplifier circuit is electrically connected to the boost circuit and for receiving a reference voltage to amplify the power voltage and then outputting a high gate voltage. Here, the reference voltage is greater than the high gate voltage.

The disclosure is also directed to a display module that includes a first substrate, a pulse width modulation (PWM) signal generating circuit, a boost circuit, an amplifier circuit, a second substrate, a pixel array, and a gate driver. The PWM signal generating circuit is disposed on the first substrate for outputting a PWM signal. The boost circuit is disposed on the first substrate, is electrically connected to the PWM signal generating circuit, and for receiving an input voltage to boost the input voltage and then outputting a power voltage according to the PWM signal. The amplifier circuit is disposed on the first substrate, is electrically connected to the boost circuit, and for receiving a reference voltage to amplify the power voltage and then outputting a high gate voltage. The reference voltage is greater than the high gate voltage and is provided by a backlight module which is electrically connected to the amplifier circuit. The pixel array is disposed on the second substrate. The gate driver is disposed on the second substrate for driving the pixel array according to the high gate voltage.

In one embodiment of the disclosure, the voltage level of the high gate voltage is adjusted by the amplifier circuit. Specifically, the amplification multiple of the amplifier circuit is set by adjusting the value (e.g., resistance) of internal elements of the amplifier circuit. Thereby, no voltage-limiting device is required for adjusting the voltage level of the high gate voltage, and the additional power consumption can be precluded.

In order to make the aforementioned and other features and advantages of the disclosure more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
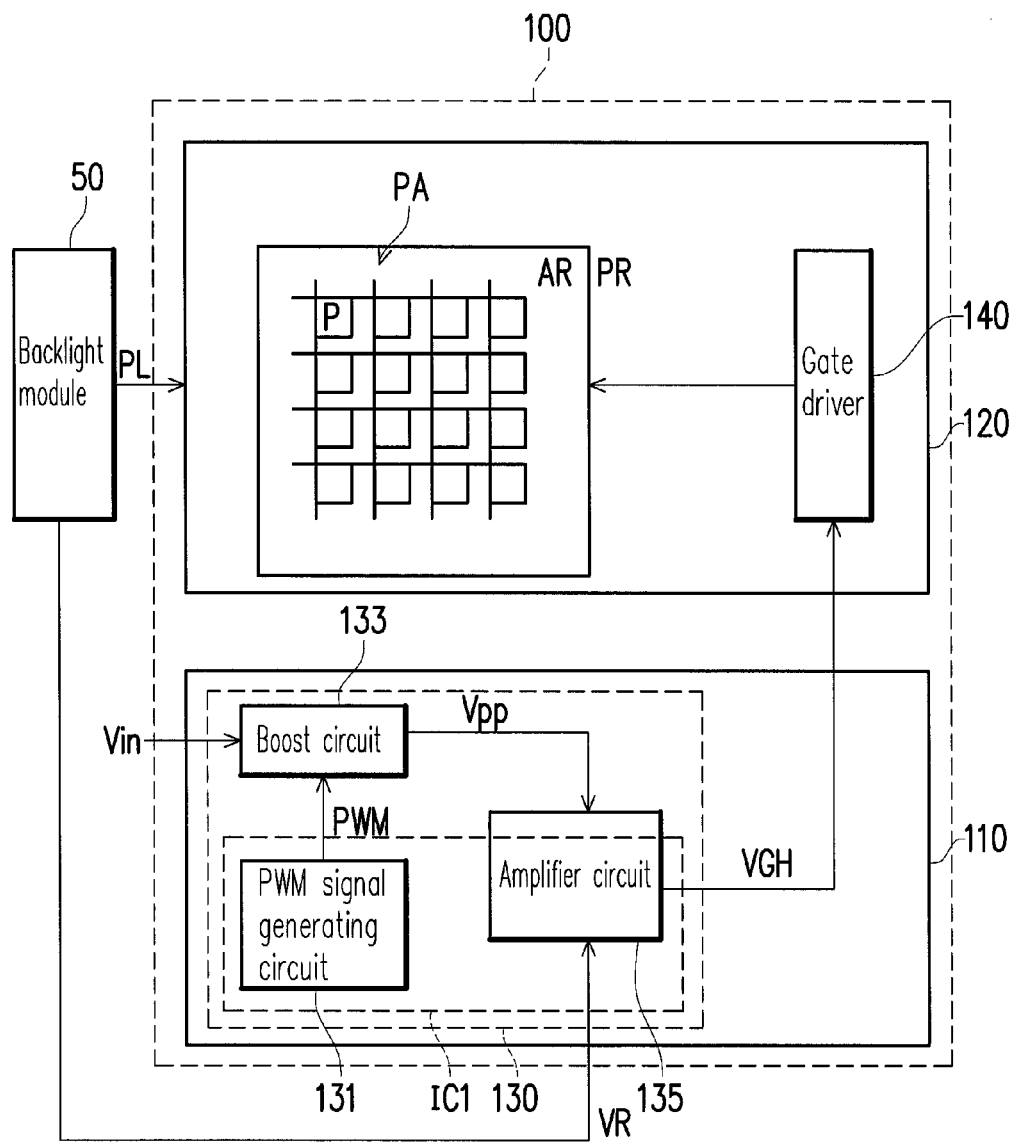
FIG. 1 is a systematic view schematically illustrating a display module and a backlight module according to an embodiment of the disclosure.

FIG. 1 is a systematic view schematically illustrating a display module and a backlight module according to an embodiment of the disclosure. With reference to FIG. 1, in the present embodiment, the display module 100 includes a first substrate 110, a second substrate 120, a high gate voltage generator 130, a gate driver 140, and a pixel array. The high gate voltage generator 130 is disposed on the first substrate 110 and includes a pulse width modulation (PWM) signal generating circuit 131, a boost circuit 133, and an amplifier circuit 135. The PWM signal generating circuit 131 is used for outputting a PWM signal. The boost circuit 133 is electrically connected to the PWM signal generating circuit 131 and used for receiving an input voltage Vin to boost the input voltage Vin and then outputting a power voltage Vpp according to the PWM signal.

The amplifier circuit 135 is electrically connected to the boost circuit 133 and used for receiving a reference voltage VR to amplify the power voltage Vpp and then outputting a high gate voltage VGH. Here, the reference voltage VR is greater than the high gate voltage VGH. For instance, it is assumed that the input voltage Vin is 3.3V, and an 8V power voltage VPP is output after the input voltage Vin is received and boosted by the boost circuit 133. After the power voltage Vpp is amplified by the amplifier circuit 135 to 18V~22V (i.e., the high gate voltage VGH), the power voltage Vpp is then output. In general, the amplification multiple of the amplifier circuit 135 may be determined by adjusting the value (e.g., resistance) of internal elements of the amplifier circuit 135, and therefore the high gate voltage generator 130 is able to adjust the voltage level of the high gate voltage VGH.

According to the present embodiment, the second substrate 120 has a display region AR and a peripheral region PR. The pixel array PA having a plurality of pixels P arranged in array is disposed in the display region AR of the second substrate 120. The gate driver 140 is disposed in the peripheral region PR of the second substrate 120. Besides, the gate driver 140 is electrically connected to the high gate voltage generator 130 to receive the high gate voltage VGH and drive the pixel array PA according to the high gate voltage VGH. Since the voltage level of the high gate voltage VGH may be adjusted based on the amplification multiple of the amplifier circuit 135, the voltage level of the high gate voltage VGH can be adjusted to the voltage level of the pixels P in no need of employing any voltage-limiting device, so as to prevent additional power consumption.

The backlight module 50 serves to provide a planar light source PL to the display module 100. Voltages are generated within the backlight module 50, so as to drive a light emitting device to emit light as the planar light source PL. When the light emitting device is light emitting diode (LED), a voltage (i.e., an LED driving voltage) for driving the LED series may be greater than the high gate voltage VGH. Hence, the backlight module 50 is able to output the voltage for driving the LED series to the amplifier circuit 135, and the output voltage may serve as the reference voltage VR. However, in some embodiments of the disclosure, voltages that greater than the high gate voltage VGH can all act as the reference voltage VR.

In the present embodiment, the PWM signal generating circuit 131 and a portion of the amplifier circuit 135 may be integrated into an integrated circuit IC1. In another embodiment, the integrated circuit IC1 may also contain a portion of driving circuits of the backlight module 50, which may be modified based on actual application requirements and should not be construed as limitations to those described in the embodiments of the disclosure. According to an embodiment of the disclosure, the first substrate 110 may be a printed circuit board, and the second substrate 120 may be a glass substrate, which should however not be construed as limitations to the disclosure.

Figure 2:
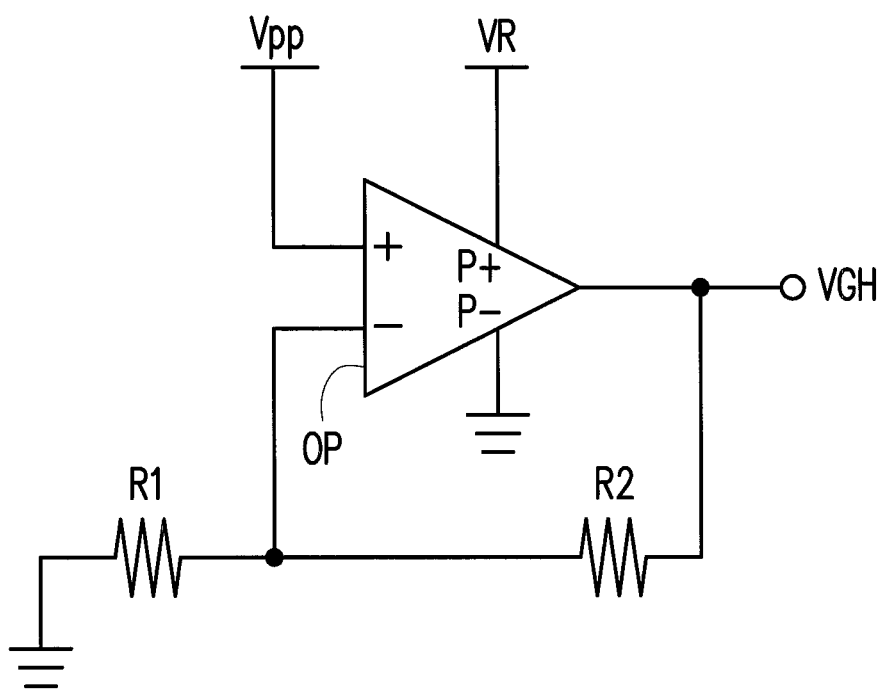
FIG. 2 is a schematic circuit diagram illustrating an amplifier circuit according to an embodiment of the disclosure.

FIG. 2 is a schematic circuit diagram illustrating an amplifier circuit according to an embodiment of the disclosure. With reference to FIG. 1 and FIG. 2, in this embodiment, the amplifier circuit 135 includes an operational amplifier OP, a first resistor R1, and a second resistor R2. The operational amplifier OP has a positive input end (corresponding to a first input end), a negative input end (corresponding to a second input end), a positive power end P+ (corresponding to a first power end), a negative power end P− (corresponding to a second power end), and an output end. The positive input end of the operational amplifier OP is used for receiving the power voltage Vpp, the positive power end P+ of the operational amplifier OP is used for receiving the reference voltage VR, the negative power end P− of the operational amplifier OP is used for receiving the ground voltage, and the output end of the operational amplifier OP is used for outputting the high gate voltage VGH.

The first resistor R1 is electrically connected between the negative input end of the operational amplifier OP and the ground voltage. The second resistor R2 is electrically connected between the negative input end and the output end of the operational amplifier OP. According to the circuit operating principle, the amplification multiple of the amplifier circuit 135 is determined by a ratio of a resistance of the second resistor R2 to a resistance of the first resistor R1 (i.e., 1+R2/R1). In other words, the amplification multiple of the power voltage Vpp is determined by the ratio of the resistance of the second resistor R2 to the resistance of the first resistor R1.

In the present embodiment, the PWM signal generating circuit 135 and the operational amplifier OP may be integrated into the integrated circuit IC 1, and the first resistor R1 and the second resistor R2 may be electrically connected to the negative input end and the output end of the operational amplifier OP through leads of the integrated circuit IC1, so as to change the resistance of the second resistor R2 and the resistance of the first resistor R1 and further adjust the amplification multiple of the amplifier circuit 135. However, if the amplification multiple of the amplifier circuit 135 is fixed, the first resistor R1 and the second resistor R2 may also be integrated into the integrated circuit IC1, which can be determined based on the design known to people having ordinary skill in the pertinent art.

Figure 3:
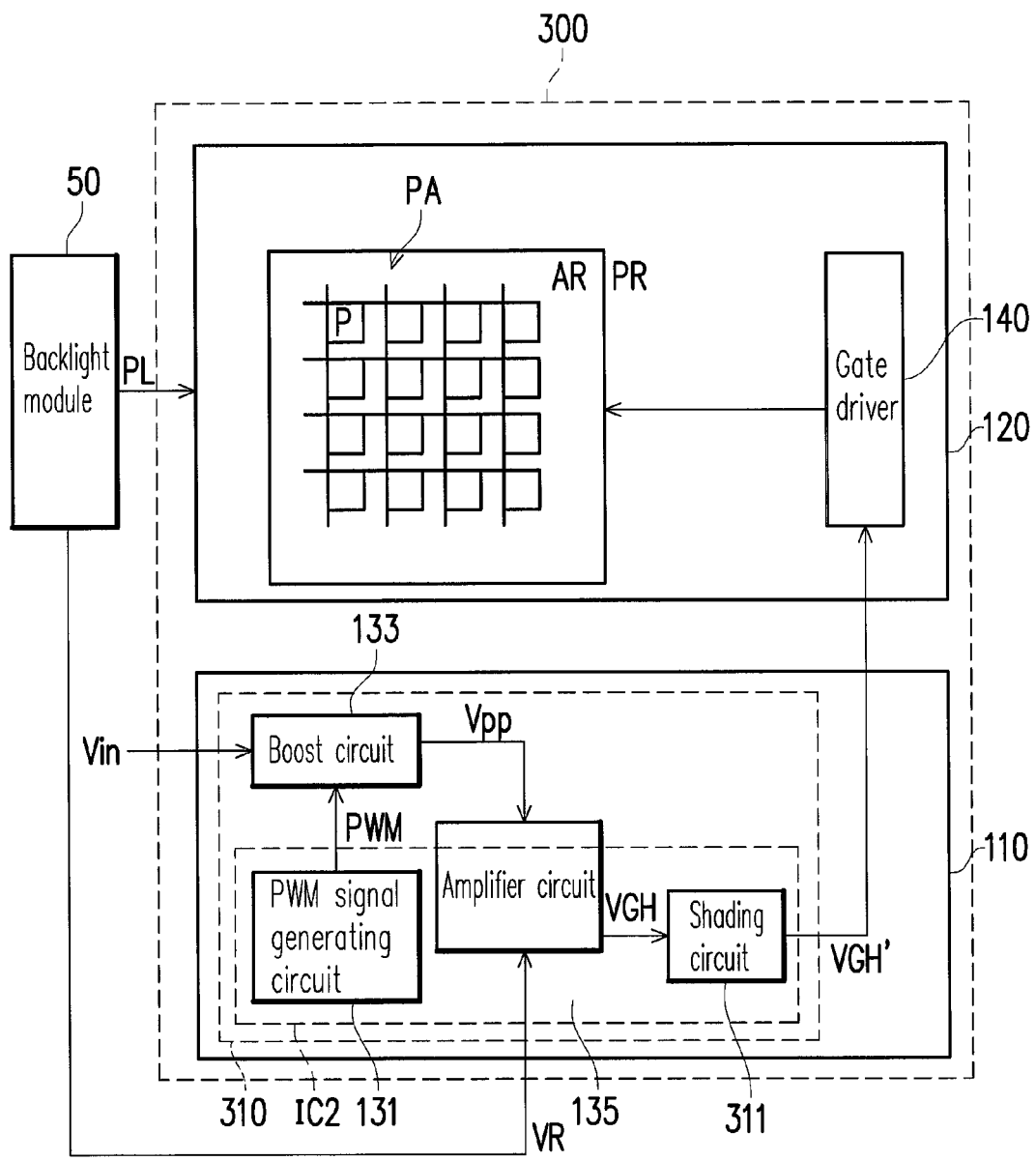
FIG. 3 is a systematic view schematically illustrating a display module and a backlight module according to another embodiment of the disclosure.

FIG. 3 is a systematic view schematically illustrating a display module and a backlight module according to another embodiment of the disclosure. With reference to FIG. 1 and FIG. 3, the difference therebetween lies in the high gate voltage generator 310 of the display module 300. According to the present embodiment, the high gate voltage generator 310 further includes a shading circuit 311. The shading circuit 311 is disposed on the first substrate 110 and electrically connected between the amplifier circuit 135 and the gate driver 140 for shading the high gate voltage VGH and then outputting the shaded high gate voltage VGH' to the gate driver 140. Thereby, the gate driver 140, based on the shaded high gate voltage VGH', drives the pixel array PA. Thereby, the feed-through voltage effect of the display module 300 can be lessened to restrain image flickers.

In the present embodiment, the PWM signal generating circuit 131, a portion of the amplifier circuit 135, and the shading circuit 311 are integrated into an integrated circuit IC2. Besides, in another embodiment, the integrated circuit IC2 may also contain a light source driving circuit, which may be modified based on actual application requirements and should not be construed as limitations to those described in the embodiments of the disclosure.

In view of the above, the display module and the high gate voltage generator described in the embodiments of the disclosure adjust the voltage level of the high gate voltage through the amplifier circuit. Since the amplification multiple of the amplifier circuit may be set by adjusting the value of the internal elements of the amplifier circuit, no voltage-limiting device is required for adjusting the voltage level of the high gate voltage, and the additional power consumption can be precluded.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A high gate voltage generator comprising:
a pulse width modulation signal generating circuit for outputting a pulse width modulation signal;
a boost circuit electrically connected to the pulse width modulation signal generating circuit and for receiving an input voltage to boost the input voltage according to the pulse width modulation signal and then outputting a power voltage; and
an amplifier circuit electrically connected to the boost circuit and for receiving a reference voltage to amplify the power voltage and then outputting a high gate voltage, wherein the reference voltage is greater than the high gate voltage.
2. The high gate voltage generator as recited in claim 1, further comprising:

a shading circuit electrically connected to the amplifier circuit for shading the high gate voltage and then outputting the shaded high gate voltage.

3. The high gate voltage generator as recited in claim 2, wherein the pulse width modulation signal generating circuit, a portion of the amplifier circuit, and the shading circuit are integrated into an integrated circuit.

4. The high gate voltage generator as recited in claim 1, wherein the pulse width modulation signal generating circuit and a portion of the amplifier circuit are integrated into an integrated circuit.

5. The high gate voltage generator as recited in claim 1, the amplifier circuit comprising:
   an operational amplifier having a first input end for receiving the power voltage, a second input end, a first power end for receiving the reference voltage, a second power end for receiving a ground voltage, and an output end for outputting the high gate voltage;
   a first resistor electrically connected between the second input end and the ground voltage; and
   a second resistor electrically connected between the second input end and the output end,
   wherein an amplification multiple of the power voltage is determined by a ratio of a resistance of the second resistor to a resistance of the first resistor.

6. The high gate voltage generator as recited in claim 5, wherein the first input end is a positive input end, and the second input end is a negative input end.

7. The high gate voltage generator as recited in claim 5, wherein the pulse width modulation signal generating circuit and the operational amplifier are integrated into an integrated circuit.

8. A display module comprising:
   a first substrate;
   a pulse width modulation signal generating circuit disposed on the first substrate for outputting a pulse width modulation signal;
   a boost circuit disposed on the first substrate, electrically connected to the pulse width modulation signal generating circuit, and for receiving an input voltage to boost the input voltage according to the pulse width modulation signal and then outputting a power voltage;
   an amplifier circuit disposed on the first substrate, electrically connected to the boost circuit, and for receiving a reference voltage to amplify the power voltage and then outputting a high gate voltage, wherein the reference voltage is greater than the high gate voltage, and the reference voltage is provided by a backlight module electrically connected to the amplifier circuit;
   a second substrate;
   a pixel array disposed on the second substrate; and
   a gate driver disposed on the second substrate for driving the pixel array according to the high gate voltage.

9. The display module as recited in claim 8, further comprising:
   a shading circuit disposed on the first substrate and electrically connected between the amplifier circuit and the gate driver for shading the high gate voltage and then outputting the shaded high gate voltage to the gate driver.

10. The display module as recited in claim 9, wherein the pulse width modulation signal generating circuit, a portion of the amplifier circuit, and the shading circuit are integrated into an integrated circuit.

11. The display module as recited in claim 8, wherein the pulse width modulation signal generating circuit and a portion of the amplifier circuit are integrated into an integrated circuit.

12. The display module as recited in claim 8, wherein the amplifier circuit comprises:
   an operational amplifier having a first input end for receiving the power voltage, a second input end, a first power end for receiving the reference voltage, a second power end for receiving a ground voltage, and an output end for outputting the high gate voltage;
   a first resistor electrically connected between the second input end and the ground voltage; and
   a second resistor electrically connected between the second input end and the output end,
   wherein an amplification multiple of the power voltage is determined by a ratio of a resistance of the second resistor to a resistance of the first resistor.

13. The display module as recited in claim 12, wherein the first input end is a positive input end, and the second input end is a negative input end.

14. The display module as recited in claim 12, wherein the pulse width modulation signal generating circuit and the operational amplifier are integrated into an integrated circuit.

15. The display module as recited in claim 8, wherein the reference voltage is a driving voltage of a light emitting device of the backlight module.

* * * * *